Feb. 21, 1961 R. W. FRITTS ET AL 2,972,653

THERMOELECTRIC GENERATOR

Filed Nov. 24, 1953

INVENTORS

Robert W. Fritts

Sebastian Karrer

By Brown, Jackson, Boettcher & Dienner

Attorneys

United States Patent Office 2,972,653

Patented Feb. 21, 1961

2,972,653

THERMOELECTRIC GENERATOR

Robert W. Fritts, Elm Grove, Wis., and Sebastian Karrer, Port Republic, Md., assignors, by mesne assignments, to Minnesota Mining and Manufacturing Company, St. Paul, Minn., a corporation of Delaware Filed Nov. 24, 1953, Ser. No. 394,008

8 Claims. (Cl. 136—4)

This invention relates to thermoelectric generators, and more particularly, thermocouples wherein at least one element is a semi-metallic alloy. A "semi-metallic alloy," as the term is used throughout this specification and in the appended claims, is to be understood as meaning an alloy having lower mechanical strength than that ordinarily exhibited by metals, and whose composition is chemically reactive, especially at elevated temperatures, requiring isolation from substances having deleterious affinity therefor. Such alloys are further characterized by having high thermoleectric power with respect to a metal, low resisitivity (the temperature coefficient of which is positive) and low thermal conductivity with respect to a metal. Examples of such "semi-metallic alloys" are certain lead and tellurium, lead and selenium, and lead and selenium-tellurium alloys. Other examples of "semi-metallic alloys" are the zinc-antimony alloys described in U.S. Patents Nos. 2,229,482 and 2,366,881 to Telkes, the copper-silver-selenium alloys described in U.S. Patent No. 2,232,960 to Milnes, the copper-silver-tellurium-selenium-sulphur alloys described in U.S. Patent No. 2,397,756 to Schwarz, and the silver-tellurium alloys described in U.S. Patent No. 2,602,095 to Faus.

Utilization of the semi-metallic alloys aforeindicated as elements of thermocouples presents problems not ordinarily encountered in the use, for example, of metallic thermocouple elements, which problems result from the characteristic physical and chemical differences between metallic elements and the semi-metallic elements aforementioned. Utilization of such elements as thermocouple elements of necessity subjects the element to high temperatures and to large temperature changes, which would quickly destroy such elements if treated in the same manner as metallic elements, since at elevated temperatures semi-metallic elements of the type under consideration oxidize rapidly and suffer undesired changes of electrical properties. Moreover, the mechanical strength of such semi-metallic elements is such that they are able to withstand only small tensile or shearing stresses, although mild compressive loads can be supported indefinitely. Accordingly, compensation for any mismatch in the thermal expansion and contraction as between the semi-metallic thermoelectric element and the second thermoelectric element of the thermoelectric generator must be provided.

The foregoing mechanical and chemical limitations impose stringent requirements for any mounting of such semi-metallic elements that are intended to extract thermal energy from a source of heat for an extended period of time.

Accordingly, among the objects of the present invention are the provision of mountings and thermocouple assemblies for thermocouple elements of semi-metallic alloys of the type aforeindicated which afford the following:

(1) Disposition of the element in an inert atmosphere and hermetic sealing of the element from oxygen and other deleterious gases for the lifetime of the unit.

(2) Isolation of the element from many external shock or mechanical forces.

(3) Provision for freedom of movement of one end of the element to move for displacement relative to other parts of the assembly to relieve any compressive or tensile stresses arising from a differential expansion or contraction of the element with respect to other parts of the assembly, during heating and/or cooling.

(4) Efficient heat transfer through the assembly and particularly the electrical connections comprising the hot and cold junctions thereof to afford maximum conversion efficiency.

(5) Provision of means for cooling the cold junctions of the assemblies to afford high conversion efficiency.

Another object of the invention is to provide a concentrically arranged thermocouple assembly affording the aforementioned characteristics and more specifically providing hermetic sealing of the inner thermocouple element while permitting it to float free of mechanical stresses.

Other objects and advantages will hereinafter appear or become apparent from the following description, it being understood that the embodiment of the drawings is illustrative only.

Figures 1, 2:
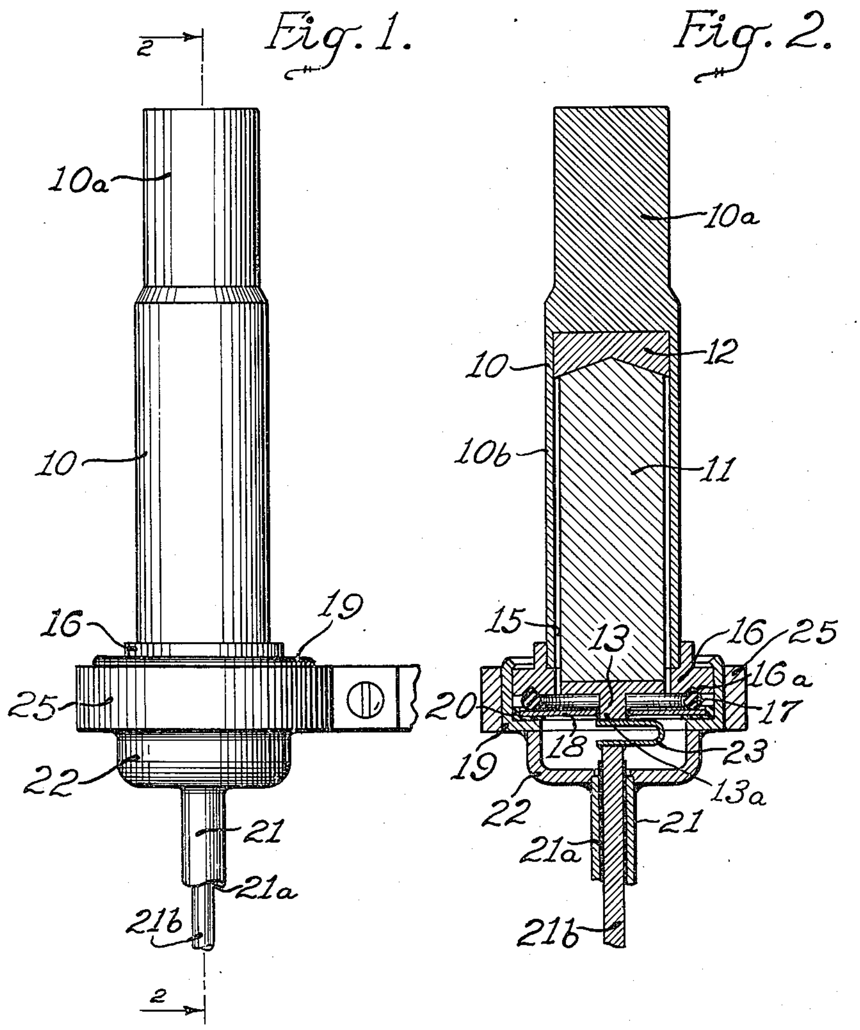
Figure 1 is an elevational view of one form of thermoelectric generator assembly constructed in accordance with the teachings of the present invention.
Figure 2 is a sectional view taken on the line 2—2 of Figure 1.
Figure 3:
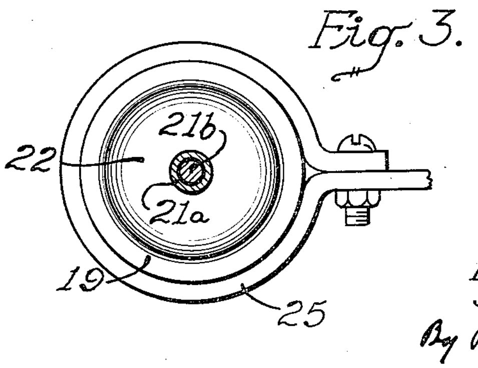
Figure 3 is an end elevational view of the assembly illustrated in Figures 1 and 2.

Referring to the drawings, particularly Figures 1 and 2 thereof, we have shown a thermoelectric generator, comprising a pair of thermocouple element means 10 and 11. The thermocouple element means 10 in the illustrated embodiment of our invention comprises a generally cup-shaped member, preferably of stainless steel, having a hollow tubular sleeve or sheath portion 10*b*, which serves as the outer element of the assembly, and a tip portion 10*a* which, as shown, may be conveniently formed integrally at one end of the sleeve or sheath portion, hermetically sealing or closing the latter at that end, and serving as a heat probe element means for the assembly. The thermocouple element means 10 and 11 are mechanically and electrically joined at one end only as through a contact electrode 12, to be hereinafter described, to provide a hot junction for the thermocouple. Where the thermocouple element means 10 is of stainless steel or of an iron alloy the contact electrode 12 may, if desired, be formed as an integral part of the element 10 in which case the element 11 is joined thereto by the fusion method of contacting hereinafter referred to. The element 11 in the assembly aforedescribed is the negative element of the couple, while the stainless steel sheath 10 serves both to enclose the element 11 and the hot junction, as well as the function as the positive member of the couple when the couple is heated at the hot junction. The thermal voltages developed in the elements 10 and 11 are of opposite sign (relative to platinum) with respect to the temperature gradient and hence are additive in a series circuit formed between a cold junction contact electrode 13 and the cold end of the sheath. The voltage developed in the sheath is small by comparison to that of the element 11, wherefore the latter, conveniently for purposes of this specification, is denominated the "active" element.

The "active" element 11 may, as aforementioned, be, for example, of a lead and selenium-tellurium alloy. Such an element comprises lead and selenium-tellurium constituents melted together at from about 1688 degrees Fahrenheit to 1953 degrees Fahrenheit, depending upon the proportions of selenium and tellurium constituents, preferably in a reducing atmosphere and cast into the desired shape, after which it is preferably annealed at from 1200 degrees Fahrenheit to 1500 degrees Fahrenheit for from ten to twenty hours. The element 11 is further to be understood in this instance as consisting of lead and selenium-tellurium constituents, the selenium-tellurium constituent varying linearly in percent by weight of the element with the atomic proportions of selenium and tellurium in said selenium-tellurium constituent, the selenium-tellurium constituent ranging from a minimum of 25 percent and a maximum of 27.55 percent when tellurium is but a trace in selenium, to a minimum of 35 percent and a maximum of 38.05 percent when selenium is but a trace in tellurium, the balance of the element in each instance being substantially all lead. The element 11 aforementioned is also, in this instance, to be understood as containing metallic impurity not exceeding the order of 0.01 percent and to be substantially oxygen free. Further details with respect to the composition of element 11 may be found in the copending application of Sebastian Karrer, Serial No. 302,621, filed August 4, 1952, now abandoned, owned by the assignee of our instant application.

Elements of the character aforedescribed, as previously pointed out, have particular utility as an element for thermoelectric conversion of heat to electrical energy. For example, an element in which the lead constituent is 63 percent by weight, remainder substantially all tellurium with but a trace of selenium, exhibits a thermoelectric power of −270 microvolts per degree centigrade against copper, and a resistivity of .001 ohm-cm. at room temperature.

From the foregoing it may be observed that the assembly described may be characterized as the combination of a semi-metallic inner element and a metallic (stainless steel) outer element forming a thermocouple that exhibits the high conversion efficiency of the semi-metallic alloy, and simultaneously, the mechanical strength and chemical inertness of the stainless steel element, provided, of course, the element 11 is hermetically sealed and mounted, as will hereinafter be more fully described.

Mechanical and electrical contact between the outer element or sheath 10 and the active element 11 at the hot junction, and electrical connection at the cold junction end of the element 11, is made on a substantial area through contact electrodes 12 and 13, respectively. Such contact electrodes provide contacts of low thermal and electric resistance, and are chemically stable with respect to the active element 11. Iron is especially adapted for such contact electrodes with the lead and selenium-tellurium active element 11 aforedescribed. These contact electrodes may be of the type more fully described in the copending application of Russell E. Fredrick, Robert W. Fritts and William V. Huck, Serial No. 366,238, filed July 6, 1953, now abandoned.

Such contact electrodes 12 and 13 may be of either a pressure or bonded type. In the latter case the element-electrode interface should have a mechanical strength at least comparable to that of the semi-metallic alloy of the element 11. More specifically, the contact electrodes 12 and 13 may be bonded to the active element 11 by either the "direct casting" or "fusion" method, more fully hereinafter described. If the "direct casting" method is utilized, the iron of the electrode is preferably stabilized in the alpha phase by addition of one or more of known alpha-phase stabilizers. A preferred stabilizer for this purpose is, however, molybdenum in amount of from 2.7 percent to 7 percent by weight of the iron.

If the "fusion" method of contacting the element 11 is utilized, the iron of the electrode may be stabilized in the gamma phase, alpha phase, or unstabilized. Whether the "direct casting" or "fusion" method is utilized, it is important, however, that iron diffuse into the active element 11 during the contacting procedure in amount no more than 0.5 percent by weight of the element lest the thermoelectric power and electrical resistivity of the element 11 be reduced more than 10 percent.

As aforementioned, the thermocouple element means 10 and 11 are joined to form an electrical connection at the hot junction only, the element 11 being spaced throughout the remainder of its length from the sheath 10. This space, best illustrated at 15 in Figure 2, serves to insulate electrically the elements from each other, and is preferably filled with an inert atmosphere to prevent oxidation of the active element 11.

Sealing means are provided to seal the space 15 from ambient atmosphere which means, as shown in Figure 2, primarily comprise an annular collar 16 (preferably of brass) brazed or otherwise attached to the open end of the sheath 10, providing the assembly an outer cold junction. The collar has a circular groove **16*a* for seating therein of a resilient, electrically nonconducting elastomeric, doughnut-shaped ring 17, commonly known as an O ring. A cup-shaped member 19 affixed to the collar 16 is adapted to bear against the outer edges of a closure member in the form of a flexible diaphragm 18 to press the outer peripheral edge of the latter into sealing engagement with the O ring 17 as aforementioned, an insulating washer 20 being interposed between the member 19 and the diaphragm 18** to prevent electrical conduction therebetween.

The member 19 also serves to establish an electrically conductive relationship between the collar 16 and the outer member **21*a* of a coaxial type thermocouple lead 21 of the general type disclosed in the patent to O. J. Leins, No. 2,126,564, issued August 9, 1938, through a bracket 22 brazed or otherwise suitably connected to both the member 19 and outer thermocouple lead 21*a***.

The cold junction electrode 13 is formed with a portion **13*a* projecting centrally through and in sealed relation to the closure 18, the inner conductor 21*b* of the coaxial lead 21 makes electrical contact with portion 13*a* of contact electrode 13, and hence the inner element 11, through a flexible electrical connector 23, preferably of copper for low thermal and electrical resistance. The flexible electrical connector 23, which may be of leaf spring form best shown in Figure 2, extends between lead 21*b* and contact electrode 13 and permits takeup of displacement therebetween upon thermal contraction and expansion of the element 11, while at the same time constituting means for isolating the contact electrode 13, and hence active element 11, from external forces which might be applied to lead 21**.

The flexibility of closure member 18 constitutes means for taking up differential thermal expansion and contraction as between the element 11 and sheath 10 or more specifically the collar 16, while maintaining a hermetic seal therebetween as aforedescribed. In this connection it is to be noted that the O ring 17 is simply a static seal and is not free to move, hence imposes no residual stresses on the element 11, flexure of the metal diaphragm 18 affording the relative displacement between the parts aforementioned.

The whole assembly aforedescribed is preferably of cylindrical symmetry to facilitate the fabrication of parts on automatic machines, and the integrally formed cup-shaped case 10 is preferred to avoid any influx of oxygen that might take place through a weld, which might be imperfect, located in the hot zone.

Since, as is well known in the art, the electrical and thermal resistance of the unit are dependent upon the configuration theerof as well as the electrical and thermal conductivities of the elements 10 and 11, a relationship between the dimensions of each element can be obtained which affords the highest thermal conversion efficiency in such a mounting or assembly. For elements of any given thermal and electrical conductivities the conversion efficiency depends strongly on the ratio of thickness of the sheath 10 to radius of the element 11. It is understood, of course, that the conversion efficiency of a thermocouple is approximately proportional to the difference between the hot and cold junction temperatures. Thus, in the interest of high conversion efficiency, it is desirable to operate any thermocouple with as high a temperature difference as possible between the junctions. Therefore, with thermocouples of the character aforedescribed, in which the thermal conductivity of the semi-metallic alloy element 11 is low as compared to that of the metallic sheath 10 (for example, .02 w./cm./° C. as compared to .261 w./cm./° C.), it is desirable that the radius of the element 11 be large with respect to the thickness of the sheath 10, for example, of the order of 10 to 1. Also that, if desired, additional means may be provided for dissipation of heat at the cold junctions. As regards the cold end of the sheath 10, such means may take the form of support means 25 for attachment of the thermocouple assembly to the apparatus with which it is used. As regards the cold junction 13, heat is dissipated through the space 15 to the sheath 10 by radiation as well as by conduction through the cold junction electrode, flexible connection 23 and inner thermocouple lead 21*b*. Thus, the electrical junctions between the elements are disposed so as to provide efficient heat transfer through the element and to afford high conversion efficiency.

The method of assembling the thermocouple units aforedescribed is as follows:

The active element 11 is first assembled to the contact electrode 13 by either the "direct casting" or "fusion" method. In the "direct casting" method alpha-stabilized iron is placed in a mold, preferably of graphite, and the semi-metallic alloy aforementioned in chunk or granular form is also placed therein in contiguous engagement with the iron. The mold is then heated, preferably in a reducing atmosphere, to the melting point of the semi-metallic alloy; that is, within the temperature range of 1700 degrees Fahrenheit to 2000 degrees Fahrenheit, for a short interval of time to produce limited alloying between the iron and the semi-metallic alloy. The mold is then cooled causing the molten semi-metallic alloy to solidify as an ingot firmly bonded to the iron electrode.

Alternatively, as indicated, a semi-metallic element 11, preformed, as aforedescribed, may be bonded to the contact electrode 13 of iron by the "fusion" method. This method comprises heating the iron of the contact electrode to a temperature of 1350 degrees Fahrenheit to 1660 degrees Fahrenheit to permit migration of the iron into the semi-metallic element to form a thin layer of an alloy thereof having a melting point below the phase transformation temperature of the iron, and immediately fusing said layer and the electrode to provide the bond between the element and the electrode. In this method the iron need not be alpha-stabilized, but may be unstabilized or even gamma-phase stabilized.

The subassembly aforedescribed is then preferably annealed at from about 1050 degrees Fahrenheit to 1250 degrees Fahrenheit for from ten to twenty hours in an inert or reducing atmosphere to render the alloy more homogeneous, after which the diaphragm member 18 is suitably attached to the cold junction electrode 13.

The annealed subassembly is then inserted into the open end of the sheath member 10, which has been machined to proper dimensions, and to the bottom of which has been butt welded the contact electrode 12 (if not integral with the member 10 as aforedescribed), forming the hot junction electrode, as shown in Figure 2, the collar 16 having been previously attached to the cold end of the sheath 10 as aforedescribed. The O ring 17 is, of course, interposed between the diaphragm member 18 and collar 16. Next, the subassembly comprising the member 19 and washer 20 is affixed to the collar 16 as aforedescribed, and the seal between the diaphragm member 18 and cold junction electrode 13 is made. Finally, the bracket 22 is affixed to the member 20.

After insertion of the active element into the sheath 10, as aforementioned, the tapered end of the element 11 may then be fused to the contact electrode 12 by the "fusion" method aforedescribed, it being understood that this step is taken under a reducing atmosphere. During this step heating should be effected locally at the hot junctions to avoid damaging the assembly at the cold junction.

With completion of the assembly of the thermocouple unit aforedescribed, the unit is now ready to be connected to an external circuit and placed in operation.

We claim:

1. An incapsulated thermoelectric generator comprising, a pair of spaced apart elongated thermocouple element means, at least one of which is a semi-metallic alloy, connected at portions thereof to provide a hot junction, means for hermetically sealing said semi-metallic alloy thermocouple element means from ambient atmosphere, and means including said hermetic sealing means adjacent one end of said semi-metallic alloy thermocouple element means accommodating differential linear thermal expansion and contraction of said pair of thermocouple element means relative to each other.

2. A thermoelectric generator comprising, a pair of spaced apart elongated thermocouple element means, at least one of which is a semi-metallic alloy, connected at portions thereof to provide a hot junction, hermetic sealing means for sealing said semi-metallic alloy thermocouple element means from ambient atmosphere, connections to said thermocouple element means forming cold junctions therewith, and said hermetic sealing means including means adjacent one end of said semi-metallic alloy thermocouple element means accommodating differential linear thermal expansion and contraction of said pair of thermocouple element means relative to each other.

3. A thermoelectric generator comprising, a pair of spaced apart elongated thermocouple element means, at least one of which is a semi-metallic alloy, connected at portions thereof to provide a hot junction, cold junction means for said semi-metallic thermocouple element means, means for hermetically sealing said semi-metallic alloy thermocouple element means from ambient atmosphere, means including said last named means adjacent one end of said semi-metallic thermocouple element means accommodating differential linear thermal expansion and contraction of said pair of thermocouple element means relative to each other, and a flexible electrical connector contacting said cold junction means isolating said semi-metallic alloy thermocouple element means from external shock therethrough.

4. A thermoelectric generator comprising, a pair of spaced apart elongated thermocouple element means, at least one of which is a semi-metallic alloy, connected at portions thereof to provide a hot junction, cold junction means for said thermocouple element means, means for hermetically sealing said semi-metallic alloy thermocouple element means from ambient atmosphere, means including said last named means adjacent one end of said semi-metallic alloy thermocouple element means accommodating differential linear thermal expansion and contraction of said pair of thermocouple element means relative to each other, and means having connection with the cold junction means of at least one of said thermocouple element means for affording heat transfer therethrough.

5. A thermoelectric generator comprising, a pair of spaced apart elongated thermocouple element means, at least one of which is a semi-metallic alloy, connected at portions thereof to provide a hot junction, a first cold junction for said semi-metallic thermocouple element means, a second cold junction for the other of said thermocouple element means, means for hermetically sealing said semi-metallic alloy thermocouple element means from ambient atmosphere, means including said last named means adjacent one end of said semi-metallic alloy thermocouple element means accommodating differential linear thermal expansion and contraction of said pair of thermocouple element means relative to each other, and means for said second cold junction for affording heat transfer through said other thermocouple element means.

6. An incapsulated thermoelectric generator comprising, an outer tubular metallic thermocouple element having an opening therein, a semi-metallic inner thermocouple element disposed within said outer thermocouple element and connected thereto to afford a hot junction, cold junction means for said inner thermocouple element at the opening in said outer thermocouple element, and means for closing the opening of said outer thermocouple element to shield said inner thermocouple element from ambient atmosphere, and affording differential expansion and contraction of said thermocouple elements with respect to each other comprising, a flexible diaphragm mounted in sealed relation to said cold junction means, and a ring member of resilient material forming a seal between said diaphragm and said outer thermocouple element at the opening therein, and thermocouple cold junction electrical connections comprising, a first external circuit connection to said outer thermocouple element, and a second external circuit connection contacting said cold junction means.

7. An incapsulated thermoelectric generator comprising, an outer tubular metallic thermocouple element having an opening therein, a semi-metallic inner thermocouple element disposed within said outer thermocouple element and connected thereto to afford a hot junction, cold junction means for said inner thermocouple element at the opening in said outer thermocouple element, and means for closing the opening of said outer thermocouple element to shield said inner thermocouple element from ambient atmosphere, and affording differential expansion and contraction of said thermocouple elements with respect to each other comprising, a collar member connected to said outer thermocouple means at the opening thereof, a flexible diaphragm connected in sealed relation to said cold junction means, a ring member of resilient material disposed between said diaphragm and said collar, and a retaining member electrically insulated from said diaphragm connecting the latter and said collar member to maintain said ring member under compression therebetween, thermocouple cold junction electrical connections comprising, a first external circuit connection to said outer thermocouple element, and a second external flexible connector connected to said cold junction means isolating said inner thermocouple element from external shock therethrough.

8. The thermoelectric generator of claim 7 characterized by said inner thermocouple element being arranged concentrically of and in spaced relation to said outer thermocouple element, and in which said inner thermocouple element is of a diameter substantially in excess of the thickness of the outer thermocouple element.

References Cited in the file of this patent

UNITED STATES PATENTS

| | | |
|---|---|---|
| 425,568 | Edelkamp | Apr. 15, 1890 |
| 461,437 | Iden | Oct. 20, 1891 |
| 511,245 | Mestern | Dec. 19, 1893 |
| 1,651,750 | Brophy | Dec. 6, 1927 |
| 1,818,221 | Huber | Aug. 11, 1931 |
| 1,992,747 | Gilliland et al. | Feb. 26, 1935 |
| 2,126,564 | Leins | Aug. 9, 1938 |
| 2,229,481 | Telkes | Jan. 21, 1941 |
| 2,229,482 | Telkes | Jan. 21, 1941 |
| 2,232,960 | Milnes | Feb. 25, 1941 |
| 2,366,881 | Telkes | Jan. 9, 1945 |
| 2,397,756 | Schwarz | Apr. 2, 1946 |
| 2,602,095 | Faus | July 1, 1952 |
| 2,626,970 | Hunrath | Jan. 27, 1953 |
| 2,691,056 | Wolff | Oct. 5, 1954 |

FOREIGN PATENTS

| | | |
|---|---|---|
| 154,454 | Great Britain | Dec. 2, 1920 |

UNITED STATES PATENT OFFICE

CERTIFICATE OF CORRECTION

Patent No. 2,972,653 February 21, 1961

Robert W. Fritts et al.

It is hereby certified that error appears in the above numbered patent requiring correction and that the said Letters Patent should read as corrected below.

Column 2, line 1, for "many" read -- any --; line 58, for "the", first occurrence, read -- to --; column 4, line 70, for "theerof" read -- thereof --.

Signed and sealed this 6th day of February 1962.

(SEAL)
Attest:

ERNEST W. SWIDER
Attesting Officer

DAVID L. LADD
Commissioner of Patents